United States Patent
Kobayashi et al.

(10) Patent No.: US 11,359,676 B2
(45) Date of Patent: Jun. 14, 2022

(54) FIXED-TYPE CONSTANT VELOCITY UNIVERSAL JOINT

(71) Applicant: NTN CORPORATION, Osaka (JP)

(72) Inventors: Tomoshige Kobayashi, Shizuoka (JP); Masazumi Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 268 days.

(21) Appl. No.: 16/494,372

(22) PCT Filed: Mar. 8, 2018

(86) PCT No.: PCT/JP2018/008981
§ 371 (c)(1),
(2) Date: Sep. 16, 2019

(87) PCT Pub. No.: WO2018/168642
PCT Pub. Date: Sep. 20, 2018

(65) Prior Publication Data
US 2020/0018357 A1 Jan. 16, 2020

(30) Foreign Application Priority Data
Mar. 17, 2017 (JP) .............................. JP2017-052663

(51) Int. Cl.
*F16D 3/224* (2011.01)
*F16D 3/2245* (2011.01)
*F16D 3/223* (2011.01)

(52) U.S. Cl.
CPC ..................... *F16D 3/2245* (2013.01); *F16D 2003/22303* (2013.01); *F16D 2003/22309* (2013.01); *Y10S 464/906* (2013.01)

(58) Field of Classification Search
CPC ......... F16D 3/2245; F16D 2003/22303; F16D 2003/22309; F16D 3/224; Y10S 464/906
(Continued)

(56) References Cited

U.S. PATENT DOCUMENTS 6,241,615 B1 * 6/2001 Jacob .................... F16D 3/2237
464/145
2016/0138660 A1 5/2016 Hirukawa et al.

FOREIGN PATENT DOCUMENTS

JP 3-113124 5/1991
JP 10-103365 4/1998
(Continued)

OTHER PUBLICATIONS

Notice of Reasons for Refusal dated Nov. 20, 2020 in corresponding Japanese Patent Application No. 2017-052663, with English Translation.
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint (3) includes an outer joint member (31), an inner joint member (32), eight balls (33), and a cage (34). A diameter ($D_{31c}$) of the outer joint member (31) at an opening end of an inner peripheral surface (31c) is set larger than an outer diameter ($D_{34b}$) of the cage (34) at a center portion in a circumferential direction of pockets (34a) when the cage (34) is seen from an axial direction of the joint. A bottom surface (31f) of a mouth section (31a) of the outer joint member (31) is arranged so as to interfere with an imaginary spherical surface (Q) being an extension of the inner peripheral surface (31c) of the outer joint member (31) toward a deep-side.

1 Claim, 12 Drawing Sheets

(58) Field of Classification Search
USPC .......................................................... 464/145
See application file for complete search history.

(56) References Cited

FOREIGN PATENT DOCUMENTS

| | | |
|---|---|---|
| JP | 2007-078124 | 3/2007 |
| JP | 2007-120546 | 5/2007 |
| WO | 2014/208242 | 12/2014 |

OTHER PUBLICATIONS

International Preliminary Report on Patentability dated Sep. 17, 2019 in International (PCT) Patent Application No. PCT/JP2018/008981.
International Search Report dated May 22, 2018 in International (PCT) Application No. PCT/JP2018/008981.
Extended European Search Report dated Nov. 13, 2020 in corresponding European Patent Application No. 18767389.2.

* cited by examiner

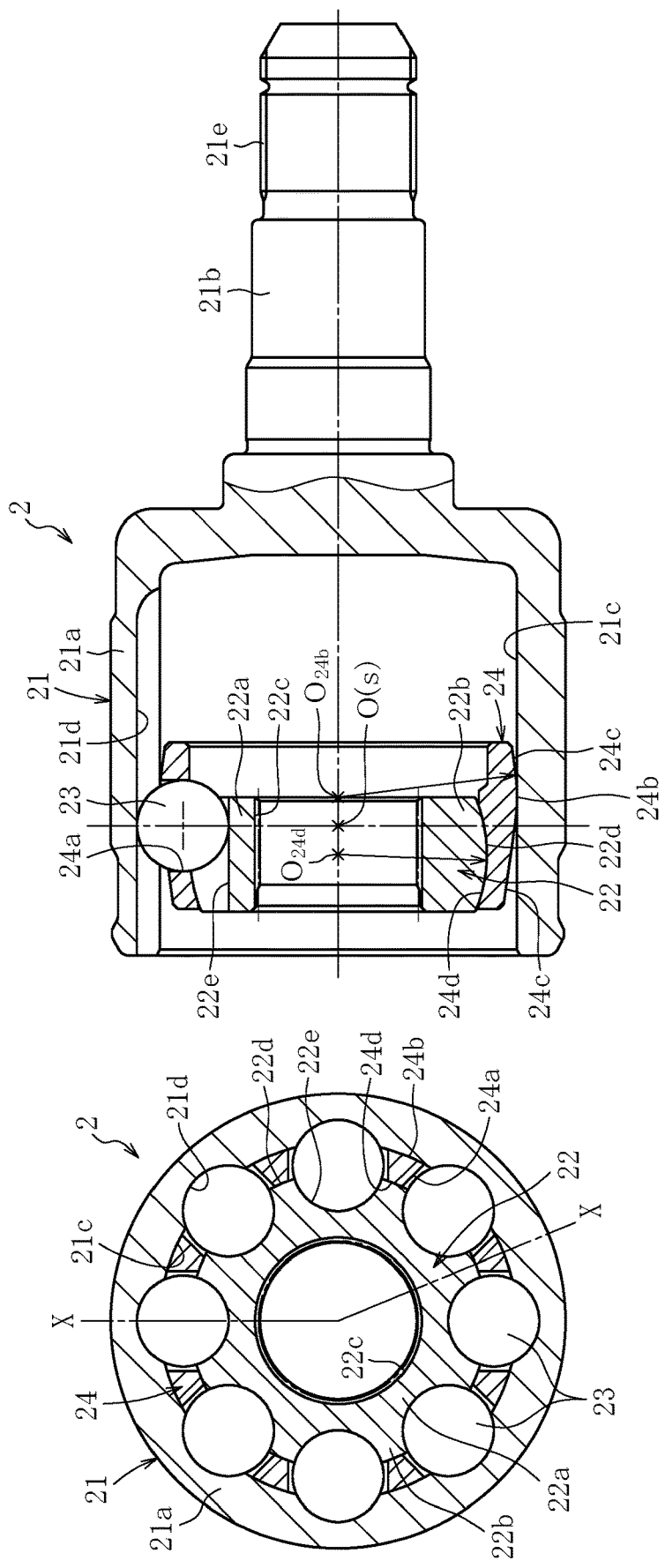

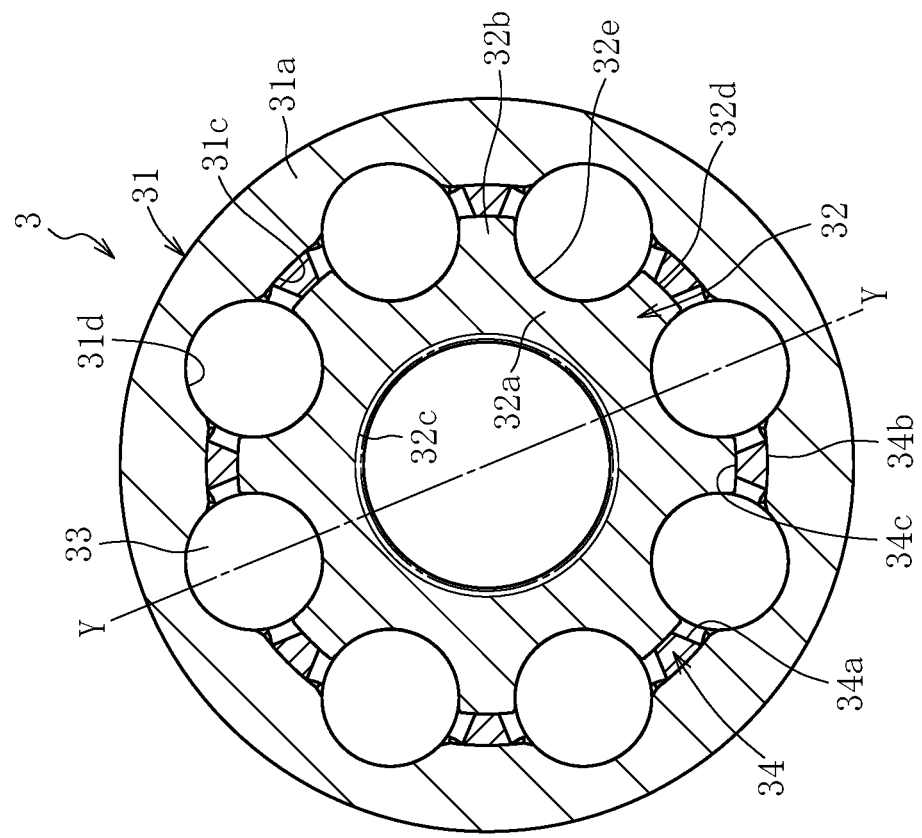
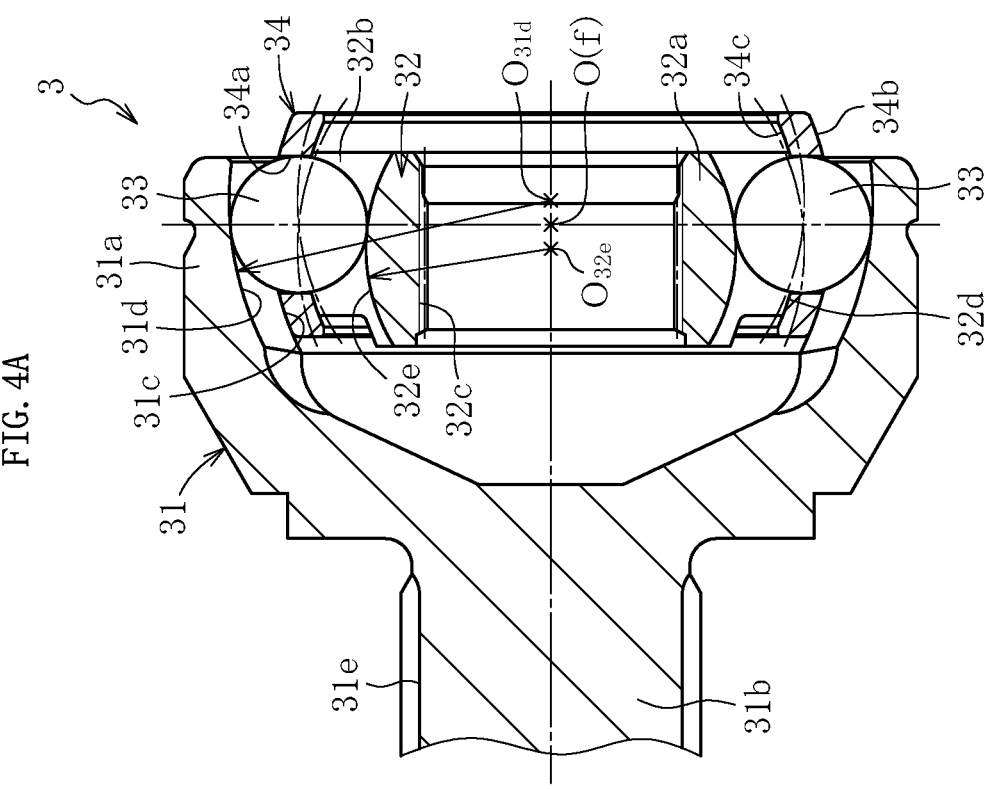

FIG. 5A1
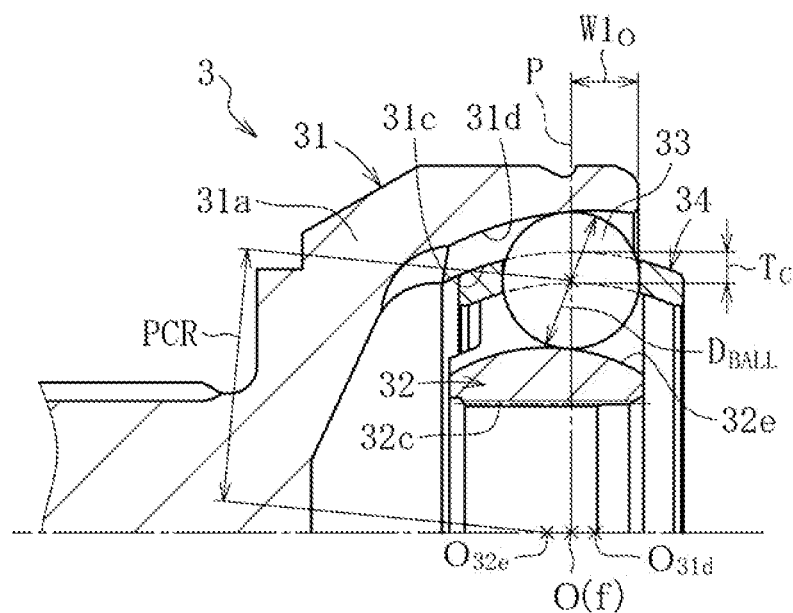
FIG. 5A2 Comparative Example
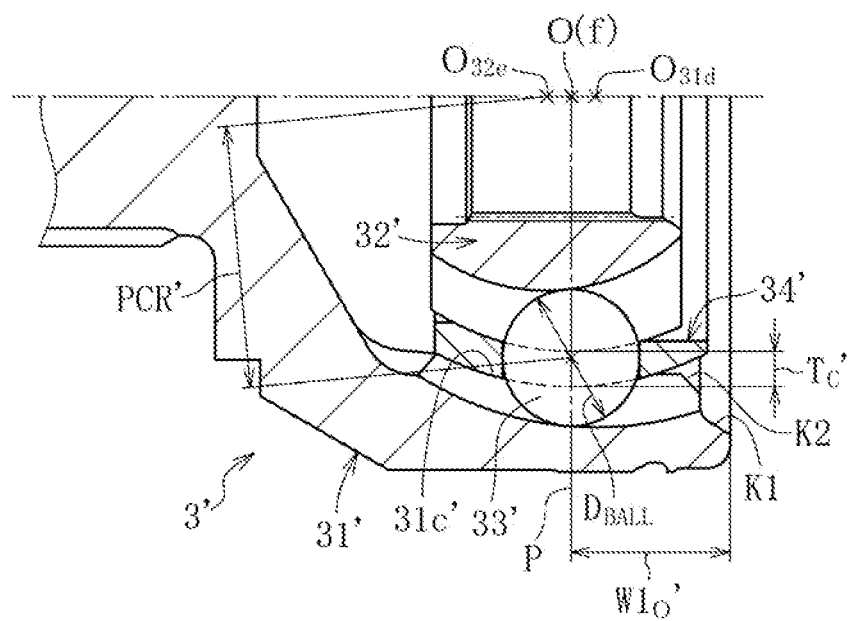

FIG. 5B1
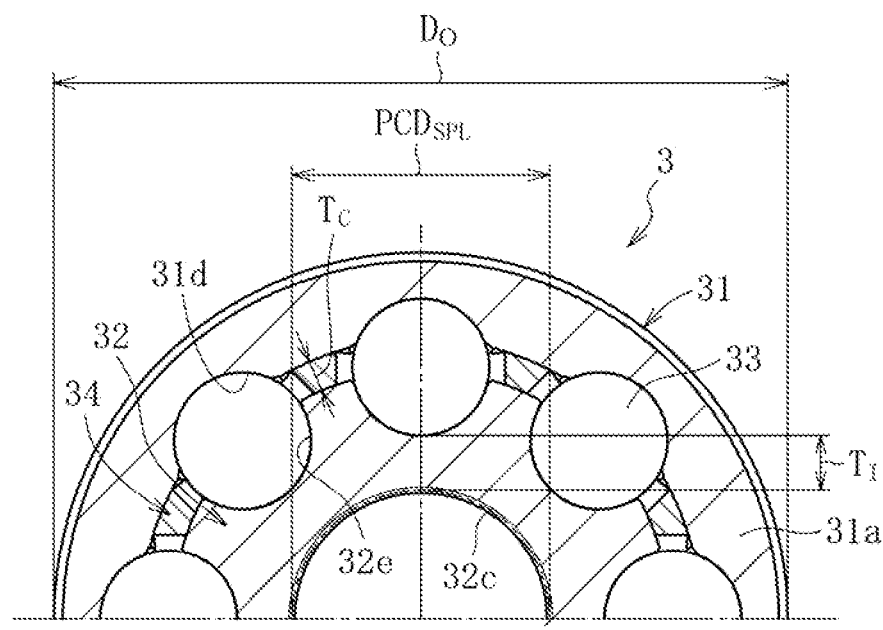
FIG. 5B2  Comparative Example
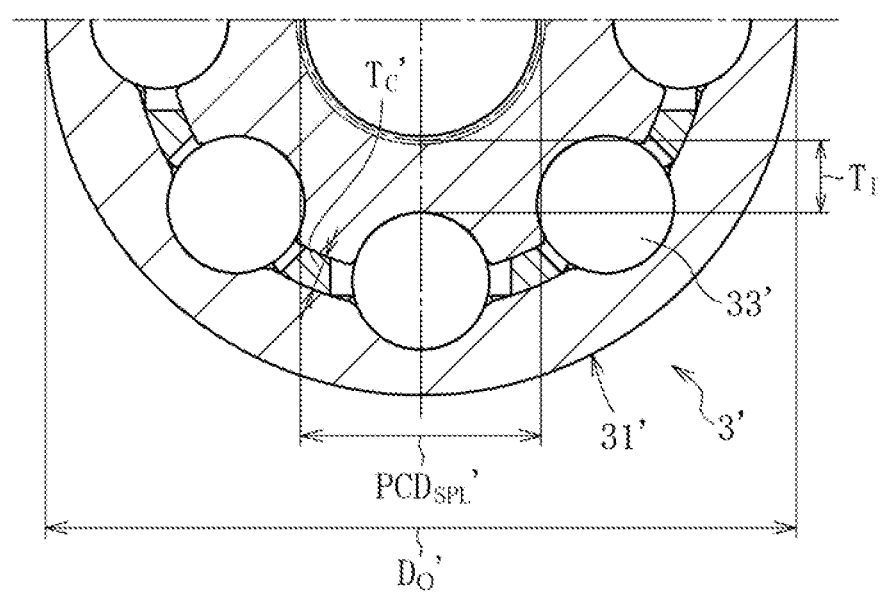

FIG. 6A
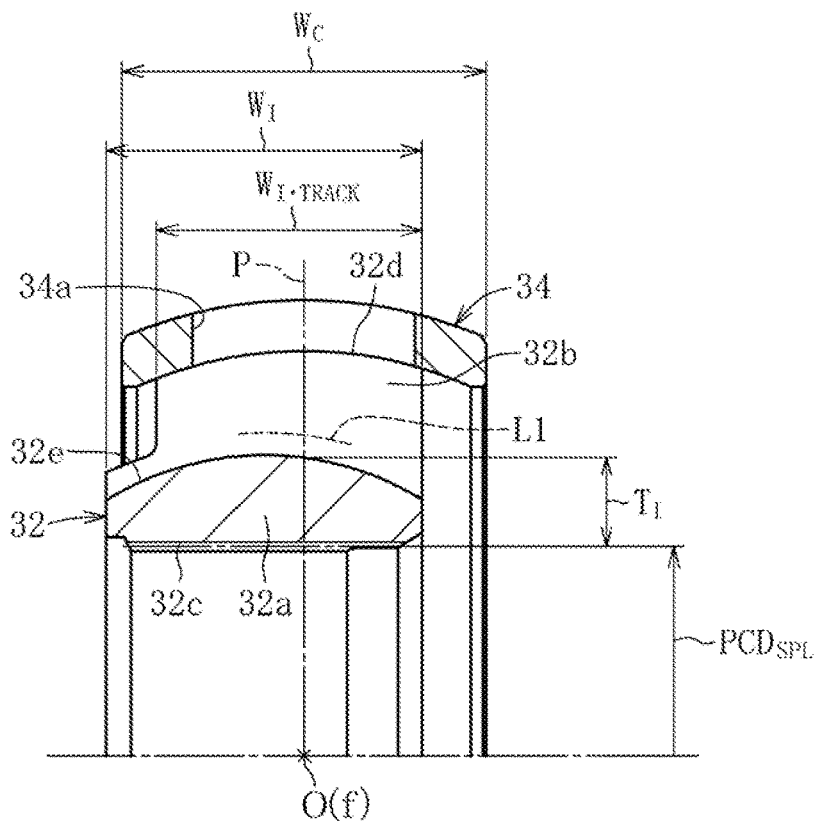
FIG. 6B  Comparative Example
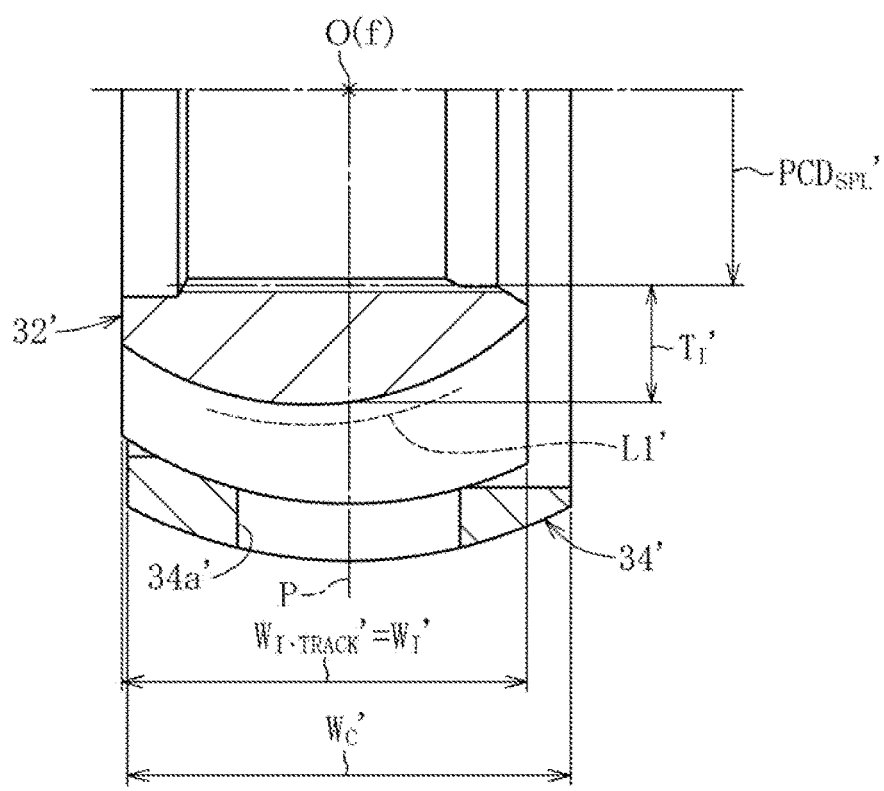

FIXED-TYPE CONSTANT VELOCITY UNIVERSAL JOINT

TECHNICAL FIELD

The present invention relates to a fixed type constant velocity universal joint.

BACKGROUND ART

As a representative of the fixed type constant velocity universal joint, a Rzeppa type constant velocity universal joint is known. In the Rzeppa type constant velocity universal joint, a curvature center of track grooves of an outer joint member and a curvature center of track grooves of an inner joint member are offset to opposite sides in an axial direction of the joint with respect to a joint center by an equal distance. With this configuration, balls are always retained within a plane obtained by bisection of an operating angle, thereby ensuring a constant velocity characteristic between the outer joint member and the inner joint member.

The Rzeppa type constant velocity universal joint typically includes six torque transmission balls. In Patent Literature 1 below, a Rzeppa type constant velocity universal joint including eight torque transmission balls is disclosed. When the number of the balls is thus set to eight, reduction in weight and size can be achieved while ensuring strength, load capacity, and durability equivalent to or higher than those of the Rzeppa type constant velocity universal joint including the six balls.

CITATION LIST

Patent Literature 1: JP H10-103365 A

SUMMARY OF INVENTION

Technical Problem

In assembly steps for the fixed type constant velocity universal joint as disclosed in Patent Literature 1 above, as illustrated in FIG. 11A and FIG. 11B, an axis of an outer joint member 101 and an axis of a cage 104 are orthogonal to each other, and under this state, the cage 104 is inserted into the outer joint member 101 from an opening side of the outer joint member 101. In this case, it is required that a space capable of receiving the cage 104 with the axis orthogonal to the axis of the outer joint member 101 be ensured inside the outer joint member 101. Specifically, it is required that a bottom surface 101f of the outer joint member 101 be arranged on a deep side with respect to an imaginary spherical surface Q' being an extension of an inner peripheral surface 101c. As a result, an axial dimension of the outer joint member 101 is increased, which leads to increase in weight.

Therefore, an object to be achieved by the present invention is to further reduce a weight and a size of a fixed type constant velocity universal joint.

Solution to Problem

In order to solve the above-mentioned problem, according to one embodiment of the present invention, there is provided a fixed type constant velocity universal joint, comprising: an outer joint member, which comprises a mouth section having a cup shape that is open toward one side in an axial direction of the fixed type constant velocity universal joint, and has a spherical inner peripheral surface in which eight track grooves are formed; an inner joint member having a spherical outer peripheral surface in which eight track grooves are formed; a plurality of balls arranged in ball tracks formed by the track grooves of the outer joint member and the track grooves of the inner joint member; and a cage, which has a plurality of pockets configured to receive the balls, and is held in slide contact with the inner peripheral surface of the outer joint member and the outer peripheral surface of the inner joint member, wherein a diameter of the outer joint member at an opening end of the inner peripheral surface is larger than an outer diameter of the cage at a center portion in a circumferential direction of the pockets when the cage is seen from the axial direction, and wherein a bottom surface of the mouth section of the outer joint member is arranged so as to interfere with an imaginary spherical surface being an extension of the inner peripheral surface of the outer joint member toward a deep side.

According to the present invention, an inner diameter of an opening portion of the outer joint member, specifically, the diameter of the outer joint member at the opening end of the inner peripheral surface is set larger than the outer diameter of the cage at the center portion in the circumferential direction of the pockets when the cage is seen from the axial direction. With this configuration, the cage and the outer joint member are aligned and arranged coaxially with each other, and under this state, the cage can be inserted into the inner periphery of the outer joint member (see FIG. 10). In this case, it is not required that the space capable of receiving the cage with the axis orthogonal to the axis of the outer joint member be ensured inside the outer joint member. Accordingly, an internal space of the outer joint member can be reduced (shallowed) as compared to that of the conventional product illustrated in FIG. 11. Specifically, the bottom surface of the mouth section of the outer joint member can be arranged so as to interfere with the imaginary spherical surface being an extension of the inner peripheral surface of the outer joint member toward a deep-side. Thus, the axial dimension of the outer joint member is reduced, and hence reduction in weight can be achieved.

Incidentally, examples of the drive shaft include a front-wheel drive shaft mounted to a front wheel, and a rear-wheel drive shaft mounted to a rear wheel. As an outboard-side fixed type constant velocity universal joint for a front-wheel drive shaft, a constant velocity universal joint having a large maximum operating angle (for example, 45° or more) is used because the constant velocity universal joint is mounted to a front wheel being a steered wheel. Meanwhile, an outboard-side fixed type constant velocity universal joint for a rear-wheel drive shaft is mounted to a rear wheel that is not steered, and hence may have a maximum operating angle smaller than that of the fixed type constant velocity universal joint for the front-wheel drive shaft.

FIG. 7 is an illustration of a state in which a fixed type constant velocity universal joint 3, which is used exclusively for the rear-wheel drive shaft and has a small operating angle, forms a maximum operating angle (20°). FIG. 8 is an illustration of a state in which a fixed type constant velocity universal joint 3', which is applicable also to the front-wheel drive shaft and has a large operating angle, forms a maximum operating angle (47°). As is apparent from FIG. 7 and FIG. 8, when the fixed type constant velocity universal joint is used exclusively for the rear-wheel drive shaft to reduce the maximum operating angle, a movement amount of each of the balls in the axial direction with respect to the outer joint member is reduced. As a result, the axial length of each of the track grooves of the outer joint member, in particular, the axial length from the joint center to an opening-side end surface of the mouth section of the outer joint member can be reduced. Thus, a projecting amount of an opening end of the spherical inner peripheral surface of the outer joint member toward the radially inner side is reduced more in the product of the present invention having a small maximum operating angle (see FIG. 5A1) than in the comparative product having a large maximum operating angle (see FIG. 5A2), thereby being capable of increasing the inner diameter of the outer joint member at the opening end. In this manner, as described above, the diameter of the outer joint member at the opening end of the inner peripheral surface can be set larger than the outer diameter of the cage at the center portion in the circumferential direction of the pockets when the cage is seen from the axial direction.

It is preferred that the fixed type constant velocity universal joint have a maximum operating angle of 20° or less.

The present invention is applicable to, for example, a fixed type constant velocity universal joint of a Rzeppa type, specifically, a fixed type constant velocity universal joint in which a curvature center of track grooves of an outer joint member and a curvature center of track grooves of an inner joint member are offset to opposite sides in an axial direction of the joint with respect to a joint center by an equal distance.

Advantageous Effects of Invention

As described above, according to the present invention, further reduction in weight and size of a fixed type constant velocity universal joint can be achieved.

BRIEF DESCRIPTION OF DRAWINGS

FIG. 3A is a longitudinal sectional view (sectional view taken along the line X-X of FIG. 3B) for illustrating a plunging type constant velocity universal joint incorporated into the above-mentioned rear-wheel drive shaft.

FIG. 3B is a transverse sectional view (sectional view taken along the plane including a joint center of FIG. 3A) for illustrating the above-mentioned plunging type constant velocity universal joint.

FIG. 4A is a longitudinal sectional view (sectional view taken along the line Y-Y of FIG. 4B) for illustrating a fixed type constant velocity universal joint incorporated into the above-mentioned rear-wheel drive shaft.

FIG. 4B is a transverse sectional view (sectional view taken along the plane including a joint center of FIG. 4A) for illustrating the above-mentioned fixed type constant velocity universal joint.

FIGS. 5A1 and 5A2 are longitudinal sectional views for illustrating the fixed type constant velocity universal joint, in which FIG. 5A1 is an illustration of a product of the present invention, and FIG. 5A2 is an illustration of a comparative product.

FIGS. 5B1 and 5B2 are transverse sectional views for illustrating the fixed type constant velocity universal joint taken along the plane including the joint center, in which FIG. 5B1 is an illustration of the product of the present invention, and FIG. 5B2 is an illustration of the comparative product.

FIGS. 6A and 6B are longitudinal sectional views for illustrating an inner joint member and a cage of the fixed type constant velocity universal joint, in which FIG. 6A an upper half is an illustration of the product of the present invention, and FIG. 6B is an illustration of the comparative product.

DESCRIPTION OF EMBODIMENTS

Now, an embodiment of the present invention is described with reference to the drawings.

Figure 1:
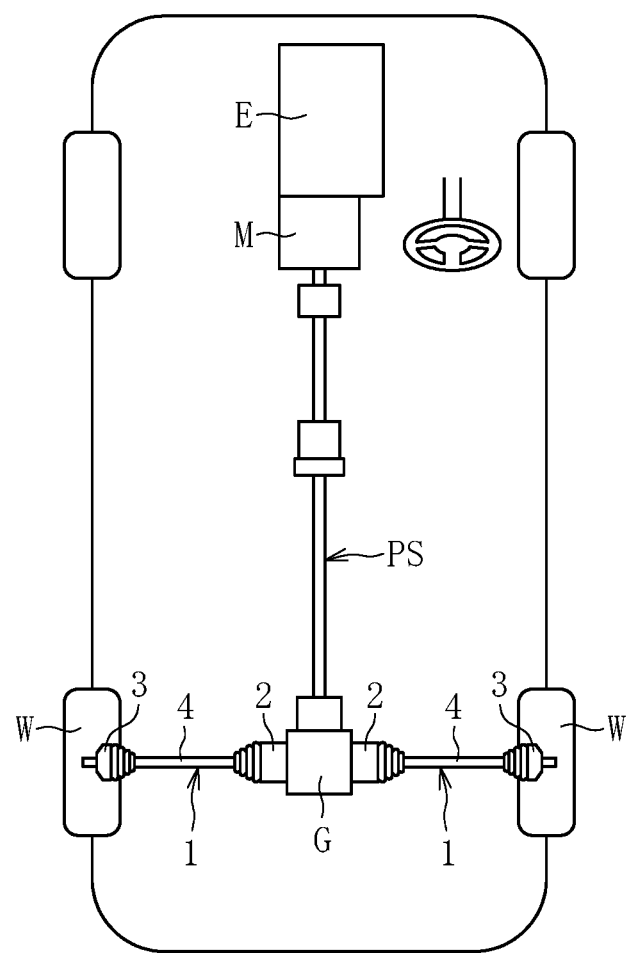
FIG. 1 is a plan view for schematically illustrating a power transmission mechanism for a rear-wheel drive vehicle.

FIG. 1 is an illustration of a power transmission mechanism for a rear-wheel drive vehicle (such as an FR vehicle) of an independent suspension type. In this power transmission mechanism, a rotational drive force output from an engine E is transmitted to a differential gear G through a transmission M and a propeller shaft PS, and then is transmitted to right and left rear wheels (wheel W) through right and left rear-wheel drive shafts 1.

Figure 2:
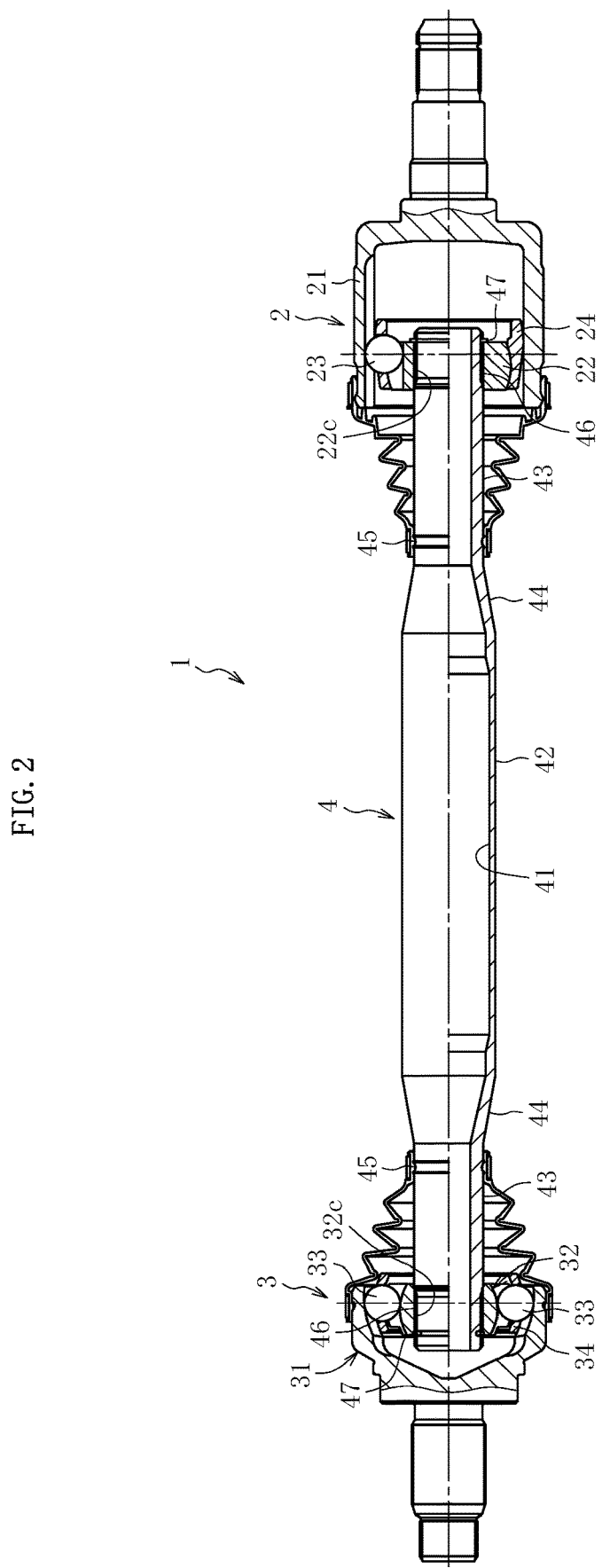
FIG. 2 is a sectional view for illustrating a rear-wheel drive shaft.

As illustrated in FIG. 2, the rear-wheel drive shaft 1 comprises a plunging type constant velocity universal joint 2, a fixed type constant velocity universal joint 3, and an intermediate shaft 4. The plunging type constant velocity universal joint 2 is provided on an inboard side (right side in FIG. 2) and is configured to allow both axial displacement and angular displacement. The fixed type constant velocity universal joint 3 is provided on an outboard side (left side in FIG. 2) and is configured to allow only angular displacement. The rear-wheel drive shaft 1 has the structure in which both the constant velocity universal joints 2 and 3 are coupled by the intermediate shaft 4. The plunging type constant velocity universal joint 2 on the inboard side is coupled to the differential gear G, and the fixed type constant velocity universal joint 3 on the outboard side is coupled to the wheel W (see FIG. 1).

As illustrated in FIG. 3, the plunging type constant velocity universal joint 2 comprises an outer joint member 21, an inner joint member 22, eight balls 23, and a cage 24.

The outer joint member 21 is mounted to the differential gear G. The inner joint member 22 is mounted to an inboard-side end portion of the intermediate shaft 4. The eight balls 23 are configured to transmit torque between the outer joint member 21 and the inner joint member 22. The cage 24 is configured to retain the eight balls 23.

The outer joint member 21 integrally comprises a mouth section 21a and a stem section 21b. The mouth section 21a has a cup shape that is open toward one side in an axial direction of the joint (outboard side or left side in FIG. 3A). The stem section 21b extends from a bottom portion of the mouth section 21a to another side in the axial direction (inboard side or right side in FIG. 3A). Eight linear track grooves 21d extending in the axial direction are formed in a cylindrical inner peripheral surface 21c of the mouth section 21a. A spline 21e to be inserted into a spline hole of the differential gear G is formed in an outer peripheral surface of an inboard-side end portion of the stem section 21b. The mouth section 21a and the stem section 21b may be integrally made of the same material, or may be joined to each other by, for example, welding after the mouth section 21a and the stem section 21b are formed into separate sections.

A spline hole 22c into which the intermediate shaft 4 is to be inserted is formed along an axial center of the inner joint member 22. Eight linear track grooves 22e extending in the axial direction are formed in a spherical outer peripheral surface 22d of the inner joint member 22. That is, the inner joint member 22 integrally comprises a cylindrical portion 22a and a plurality of protruding portions 22b. The cylindrical portion 22a has the spline hole 22c. The plurality of protruding portions 22b protrude from the cylindrical portion 22a radially outward. The track grooves 22e are formed in circumferential regions between the plurality of protruding portions 22b. Radially outer surfaces of the plurality of protruding portions 22b form the spherical outer peripheral surface 22d of the inner joint member 22.

The track grooves 21d of the outer joint member 21 and the track grooves 22e of the inner joint member 22 are opposed to each other in a radial direction to form eight ball tracks, and the balls 23 are arranged one by one in the ball tracks, respectively. A transverse sectional shape of each of the track grooves 21d and 22e is an elliptic shape or a Gothic arch shape. With this configuration, the track grooves 21d and 22e and the balls 23 are held in contact with each other at a contact angle of from about 30° to about 45°, in other words, held in so-called angular contact with each other. A transverse sectional shape of each of the track grooves 21d and 22e may be an arc shape, and the track grooves 21d and 22e and the balls 23 may be held in so-called circular contact with each other.

The cage 24 has eight pockets 24a configured to retain the balls 23. All the eight pockets 24a have the same shape, and are arranged at equal intervals in a circumferential direction of the cage 24. An outer peripheral surface of the cage 24 comprises a spherical portion 24b and conical portions 24c. The spherical portion 24b is held in slide contact with the cylindrical inner peripheral surface 21c of the outer joint member 21. The conical portions 24c extend in tangential directions from both end portions of the spherical portion 24b in the axial direction. When the plunging type constant velocity universal joint 2 forms a maximum operating angle, each of the conical portions 24c functions as a stopper configured to restrain further increase in operating angle through linear contact with the inner peripheral surface 21c of the outer joint member 21. An inclination angle of the conical portions 24c with respect to the axial center of the cage 24 is set to a half of a value of the maximum operating angle of the plunging type constant velocity universal joint 2. A spherical portion 24d is formed on the inner peripheral surface of the cage 24, and is held in slide contact with the spherical outer peripheral surface 22d of the inner joint member 22.

A curvature center $O_{24b}$ of the spherical portion 24b of the outer peripheral surface of the cage 24, and a curvature center $O_{24d}$ of the spherical portion 24d of the inner peripheral surface of the cage 24 (that is, curvature center of the spherical outer peripheral surface 22d of the inner joint member 22) are offset to opposite sides in the axial direction with respect to joint center O(s) by an equal distance. In the illustrated example, the curvature center $O_{24b}$ of the spherical portion 24b of the outer peripheral surface of the cage 24 is offset to the inboard side (joint deep side) with respect to the joint center O(s), and the curvature center $O_{24d}$ of the spherical portion 24d of the inner peripheral surface of the cage 24 is offset to the outboard side (joint opening side) with respect to the joint center O(s). With this configuration, at a freely-selected operating angle, the balls 23 retained by the cage 24 are always arranged within a plane obtained by bisection of the operating angle, thereby ensuring a constant velocity characteristic between the outer joint member 21 and the inner joint member 22.

As illustrated in FIG. 4, the fixed type constant velocity universal joint 3 comprises an outer joint member 31, an inner joint member 32, eight balls 33, and a cage 34. The outer joint member 31 is mounted to the wheel W. The inner joint member 32 is mounted to an outboard-side end portion of the intermediate shaft 4. The eight balls 33 are configured to transmit torque between the outer joint member 31 and the inner joint member 22. The cage 34 is configured to retain the eight balls 33.

The outer joint member 31 integrally comprises a mouth section 31a and a stem section 31b. The mouth section 31a has a cup shape that is open toward one side in an axial direction of the joint (inboard side or right side in FIG. 4A). The stem section 31b extends from a bottom portion of the mouth section 31a to another side in the axial direction (outboard side or left side in FIG. 4A). Eight arc-shaped track grooves 31d extending in the axial direction are formed in a spherical inner peripheral surface 31c of the mouth section 31a. The track grooves 31d extend to an opening-side end surface of the mouth section 31a. That is, a slight chamfered portion necessary for processing is formed between the track grooves 31d and the opening-side end surface of the mouth section 31a of the outer joint member 31. However, unlike a comparative product, a tapered surface K1 (see FIG. 5A2) necessary for incorporation of the balls is not formed. Further, unlike the comparative product, a tapered surface K2 (see FIG. 5A2) configured to regulate the maximum operating angle of the fixed type constant velocity universal joint through abutment against the intermediate shaft is not formed at an opening end of the inner peripheral surface 31c of the outer joint member 31. A spline 31e to be inserted into a spline hole on the wheel W side is formed in an outer peripheral surface of the stem section 31b. The mouth section 31a and the stem section 31b may be integrally made of the same material, or may be joined to each other by, for example, welding after the mouth section 31a and the stem section 31b are formed into separate sections. Further, a through hole extending in the axial direction may be formed along the axial centers of the mouth section 31a and the stem section 31b.

A spline hole 32c into which the intermediate shaft 4 is to be inserted is formed along an axial center of the inner joint member 32. Eight arc-shaped track grooves 32e extending in the axial direction are formed in a spherical outer peripheral surface 32d of the inner joint member 32. That is, the inner joint member 32 integrally comprises a cylindrical portion 32a and a plurality of protruding portions 32b. The cylindrical portion 32a has the spline hole 32c. The plurality of protruding portions 32b protrude from the cylindrical portion 32a radially outward. The track grooves 32e are formed in circumferential regions between the plurality of protruding portions 32b. Radially outer surfaces of the plurality of protruding portions 32b form the spherical outer peripheral surface 32d of the inner joint member 32.

The track grooves 31d of the outer joint member 31 and the track grooves 32e of the inner joint member 32 are opposed to each other in a radial direction to form eight ball tracks, and the balls 33 are arranged one by one in the ball tracks, respectively. A transverse sectional shape of each of the track grooves 31d and 32e is an elliptic shape or a Gothic arch shape. With this configuration, the track grooves 31d and 32e and the balls 33 are held in contact with each other at a contact angle of from about 30° to about 45°, in other words, held in so-called angular contact with each other. A transverse sectional shape of each of the track grooves 31d and 32e may be an arc shape, and the track grooves 31d and 32e and the balls 33 may be held in so-called circular contact with each other.

A curvature center $O_{31d}$ of the track grooves 31d of the outer joint member 31, and a curvature center $O_{32e}$ of the track grooves 32e of the inner joint member 32 are offset to opposite sides in the axial direction with respect to a joint center O(f) by an equal distance. In the illustrated example, the curvature center $O_{31d}$ of the track grooves 31d of the outer joint member 31 is offset to the inboard side (joint opening side) with respect to the joint center O(f), and the curvature center $O_{32e}$ of the track grooves 32e of the inner joint member 32 is offset to the outboard side (joint deep side) with respect to the joint center O(f). With this configuration, at a freely-selected operating angle, the balls 33 retained by the cage 34 are always arranged within a plane obtained by bisection of the operating angle, thereby ensuring a constant velocity characteristic between the outer joint member 31 and the inner joint member 32.

The cage 34 has eight pockets 34a configured to retain the balls 33. All the eight pockets 34a have the same shape, and are arranged at equal intervals in a circumferential direction of the cage 34. A spherical outer peripheral surface 34b of the cage 34 is held in slide contact with the spherical inner peripheral surface 31c of the outer joint member 31. A spherical inner peripheral surface 34c of the cage 34 is held in slide contact with the spherical outer peripheral surface 32d of the inner joint member 32. A curvature center of the outer peripheral surface 34b of the cage 34 (that is, curvature center of the spherical inner peripheral surface 31c of the outer joint member 31), and a curvature center of the inner peripheral surface 34c (that is, curvature center of the spherical outer peripheral surface 32d of the inner joint member 32) match with the joint center O(f).

As illustrated in FIG. 2, as the intermediate shaft 4, a hollow shaft having a through hole 41 extending in the axial direction can be used. The intermediate shaft 4 comprises a large-diameter portion 42, small-diameter portions 43, and tapered portions 44. The large-diameter portion 42 is formed at a center of the intermediate shaft 4 in the axial direction. The small-diameter portions 43 are formed at both ends of the intermediate shaft 4 in the axial direction, respectively. Each of the tapered portions 44 connects the large-diameter portion 42 and the small-diameter portion 43. An annular groove 45 for mounting a boot and a spline 46 are formed in the small-diameter portion 43 of the intermediate shaft 4. The small-diameter portion 43 has a constant outer diameter except for the annular groove 45 and the spline 46. The intermediate shaft 4 is not limited to the hollow shaft, and a solid shaft may also be used.

The spline 46 at an inboard-side end portion of the intermediate shaft 4 is press-fitted into the spline hole 22c of the inner joint member 22 of the plunging type constant velocity universal joint 2. Thus, the intermediate shaft 4 and the inner joint member 22 are coupled to each other in a torque transmittable manner through spline fitting. An annular recessed groove is formed in the inboard-side end portion of the intermediate shaft 4, and a snap ring 47 is fitted into the recessed groove. Through engagement of the snap ring 47 from the inboard side (shaft end side) of the inner joint member 22, the intermediate shaft 4 and the inner joint member 22 are prevented from coming off.

The spline 46 at an outboard-side end portion of the intermediate shaft 4 is press-fitted into the spline hole 32c of the inner joint member 32 of the fixed type constant velocity universal joint 3. Thus, the intermediate shaft 4 and the inner joint member 32 are coupled to each other in a torque transmittable manner through spline fitting. An annular recessed groove is formed in the outboard-side end portion of the intermediate shaft 4, and a snap ring 47 is fitted into the recessed groove. Through engagement of the snap ring 47 from the outboard side (shaft end side) of the inner joint member 32, the intermediate shaft 4 and the inner joint member 32 are prevented from coming off.

The plunging type constant velocity universal joint 2 and the fixed type constant velocity universal joint 3 described above are used exclusively for the rear-wheel drive shaft, and hence the maximum operating angle can be set smaller than that of a conventional product that is also usable for a front-wheel drive shaft. In this embodiment, both of the maximum operating angle of the plunging type constant velocity universal joint 2 and the maximum operating angle of the fixed type constant velocity universal joint 3 are set to 20° or less. In this manner, reduction in weight and size of the plunging type constant velocity universal joint 2 and the fixed type constant velocity universal joint 3 can be achieved while maintaining load capacity. In the following, internal specifications of the fixed type constant velocity universal joint 3 are described in detail.

In Table 1 below and FIGS. 5A1, 5A2, 5B1, 5B2, 6A and 6B, the internal specifications of the fixed type constant velocity universal joint 3 being the product of the present invention are shown and illustrated in comparison to a comparative product (Rzeppa type constant velocity universal joint having a maximum operating angle of 47° and eight balls) having the same ball diameter as that of the product of the present invention. Each of FIGS. 5A1, 5B1 and 6A is a sectional view of the fixed type constant velocity universal joint 3 being the product of the present invention, and each of FIGS. 5A2, 5B2 and 6B is a sectional view of a fixed type constant velocity universal joint 3' being the comparative product. Each component of the comparative product is denoted by the reference symbol obtained by adding a prime (') to the reference symbol of each component of the product of the present invention.

TABLE 1

| | Product of the present invention | Comparative product |
|---|---|---|
| (1) Ball PCD ($PCD_{BALL}$)/ball diameter | 3.70 to 3.87 | 3.81 to 3.98 |
| (2) Inner ring track length ($W_{I\text{-}TRACK}$)/ball diameter | 1.1 to 1.3 | 1.8 to 1.9 |
| (3) Inner ring width ($W_I$)/ball diameter | 1.40 to 1.55 | 1.8 to 1.9 |
| (4) Inner ring thickness ($T_I$)/ball diameter | 0.40 to 0.51 | 0.52 to 0.59 |
| (5) Spline PCD ($PCD_{SPL}$)/ball diameter | 1.82 to 1.92 | 1.72 to 1.82 |
| (6) Outer-ring outer diameter ($D_O$)/spline PCD ($PCD_{SPL}$) | 2.9 to 3.0 | 3.1 to 3.3 |
| (7) Length ($W1_O$) between joint center and outer-ring opening end surface/ball diameter | 0.35 to 0.52 | 1.1 to 1.2 |
| (8) Cage thickness ($T_C$)/ball diameter | 0.22 to 0.25 | 0.25 to 0.28 |
| (9) Cage width ($W_C$)/ball diameter | 1.63 to 1.80 | 1.85 to 2.02 |

Parameters are defined as follows.

(1) Ball PCD (pitch circle diameter of the balls) $PCD_{BALL}$: The ball PCD has a value twice as large as a length of a line segment connecting a center of the ball 33 to the curvature center $O_{31d}$ of the track grooves 31d of the outer joint member 31 or the curvature center $O_{32e}$ of the track grooves 32e of the inner joint member 32 (A length of a line segment connecting the center of the ball 33 to the curvature center $O_{31d}$ of the track grooves 31d of the outer joint member 31 and a length of a line segment connecting the center of the ball 33 to the curvature center $O_{32e}$ of the track grooves 32e of the inner joint member 32 are equal. A dimension of the line segments is represented by PCR.) ($PCD_{BALL}=2\times PCR$).

(2) Inner ring track length (axial length of the track groove of the inner joint member) $W_{I\text{-}TRACK}$: Strictly speaking, the inner ring track length is an axial length of a locus of a contact point between the track groove 32e of the inner joint member 32 and the ball 33. However, in Description, the inner ring track length refers to an axial length of the spherical outer peripheral surface 32d of the inner joint member 32, that is, an axial distance between end surfaces extending radially inward from both ends of the outer peripheral surface 32d in the axial direction.

(3) Inner ring width (axial width of the inner joint member) $W_I$: The inner ring width is a maximum axial dimension of the inner joint member 32. In the illustrated example, the inner ring width is an axial distance between both end surfaces of the cylindrical portion 32a of the inner joint member 32.

(4) Inner ring thickness (radial thickness of the inner joint member) $T_I$: The inner ring thickness is a radial distance between a groove bottom of the track groove 32e in a joint center plane P (plane that passes the joint center O and is orthogonal to an axis) and a pitch circle of the spline hole 32c.

(5) Spline PCD (pitch circle diameter of the spline hole of the inner joint member) $PCD_{SPL}$: The spline PCD is a diameter of a pitch circle of meshing between the spline hole 32c of the inner joint member 32 and the spline 46 of the intermediate shaft 4.

(6) Outer-ring outer diameter $D_O$: The outer-ring outer diameter is a maximum outer diameter of the outer joint member 31.

(7) Length $W1_O$ between the joint center and an outer-ring opening end surface: The length is an axial distance between the joint center O(f) and the opening-side end surface (inboard-side end surface) of the mouth section 31a of the outer joint member 31.

(8) Cage thickness $T_C$: The cage thickness is a radial thickness of the cage 34 in the joint center plane P.

(9) Cage width $W_C$: The cage width is a maximum axial dimension of the cage 34. In the illustrated example, the cage width is an axial distance between both end surfaces of the cage 34.

In the following, detailed description is made of a design concept leading to the above-mentioned internal specifications.

In the fixed type constant velocity universal joint 3, as the operating angle is increased, a maximum load applied to each of the balls 33 is increased. Accordingly, when the maximum operating angle is reduced as described above, the maximum load applied to each of the balls 33 is reduced. Thus, the inner joint member 32 to be held in contact with the balls 33 has a sufficient margin of strength. As a result, the radial thickness of the inner joint member 32 can be reduced while maintaining durability equivalent to that of the comparative product {$T_I < T_I'$, see the row (4) in Table 1 above}. When the inner joint member 32 is thus reduced in thickness, without causing reduction in load capacity and durability, the pitch circle diameter of the track grooves 32e of the inner joint member 32, that is, the pitch circle diameter of the balls 33 arranged in the track grooves 32e can be reduced as compared to that of the comparative product {$PCD_{BALL} < PCD_{BALL}'$, see the row (1) in Table 1 above}. In this manner, a size of the fixed type constant velocity universal joint 3 in the radial direction is reduced, and thus reduction in weight can be achieved.

Figure 9A:
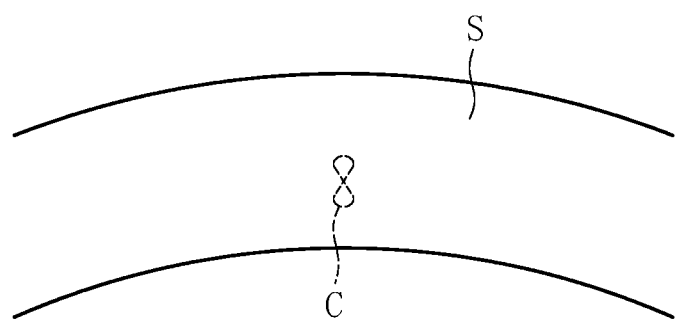
FIG. 9A is a view for illustrating a locus of a contact point between a pocket surface of the cage and a ball of the product of the present invention.
Figure 9B:
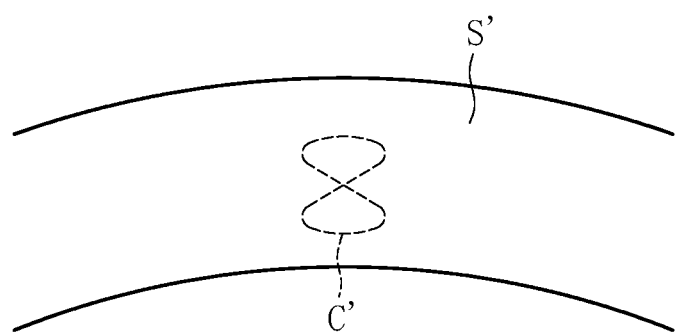
FIG. 9B is a view for illustrating a locus of a contact point between the pocket surface of the cage and the ball of the comparative product.

Through reduction of the maximum operating angle of the fixed type constant velocity universal joint 3, the maximum load applied to each of the balls 33 is reduced so that the cage 34 held in contact with the balls 33 has a sufficient margin of strength. Accordingly, the radial thickness of the cage 34 can be reduced while maintaining durability equivalent to that of the comparative product {$T_C < T_C'$, see the row (8) in Table 1 above}. Further, as is apparent from a locus C of a contact point between a pocket surface S of the cage and the ball of the product of the present invention (having a maximum operating angle of 20°) illustrated in FIG. 9A, and a locus C' of a contact point between a pocket surface S' of the cage and the ball of the comparative product (having a maximum operating angle of 47°) illustrated in FIG. 9B, when the maximum operating angle of the fixed type constant velocity universal joint 3 is reduced, a movement amount of the ball 33 in the radial direction (up-and-down direction of FIG. 9) in a pocket 34a of the cage 34 is reduced. Also from this point of view, the radial thickness of the cage 34 can be reduced. As described above, the thickness $T_C$ of the cage 34 is reduced, and the pitch circle diameter $PCD_{BALL}$ of the balls 33 is reduced at the same time. Thus, while depths of the track grooves 31d of the outer joint member 31 and depths of the track grooves 32e of the inner joint member 32 are ensured so as to prevent the balls 33 from climbing on edge portions of the track grooves, reduction in weight and size of the fixed type constant velocity universal joint 3 can be achieved.

Figure 7:
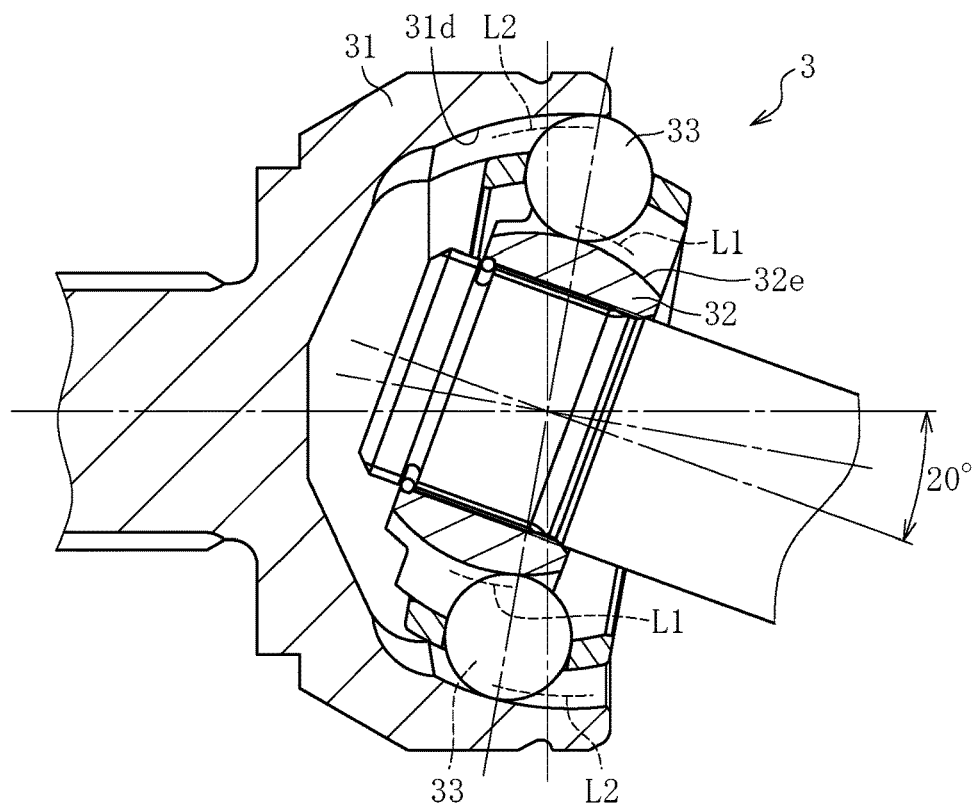
FIG. 7 is a sectional view for illustrating a state in which the fixed type constant velocity universal joint being the product of the present invention forms a maximum operating angle (20°).
Figure 8:
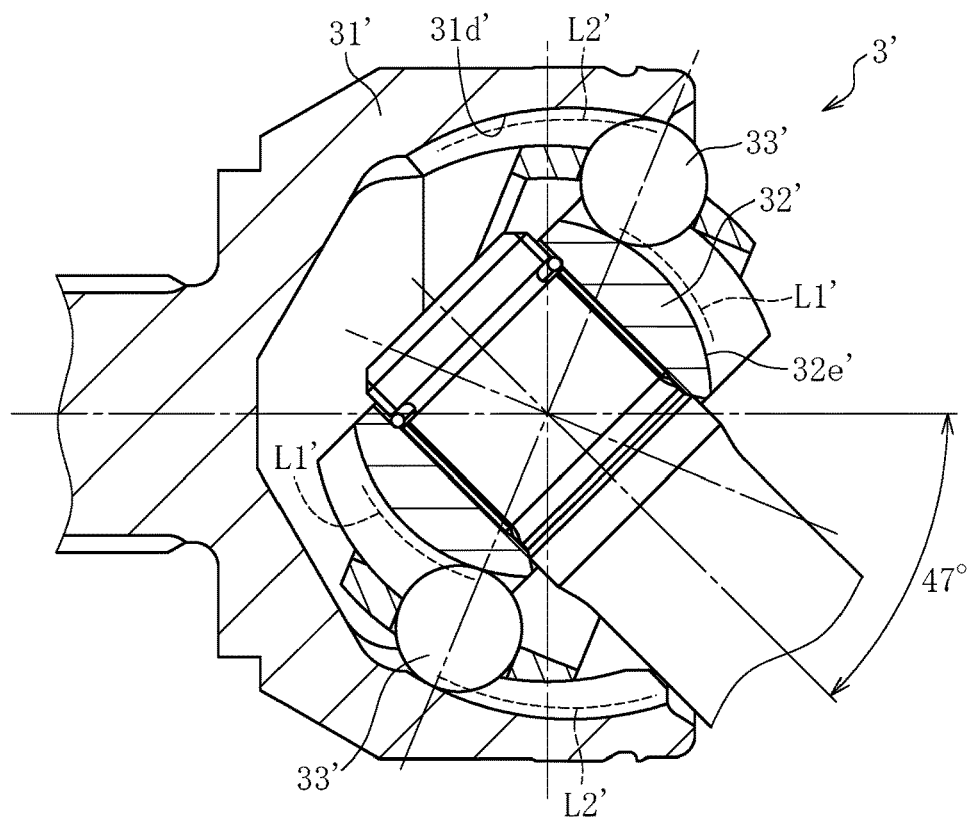
FIG. 8 is a sectional view for illustrating a state in which the fixed type constant velocity universal joint being the comparative product forms a maximum operating angle (47°).

FIG. 7 is an illustration of a state in which the fixed type constant velocity universal joint 3 being the product of the present invention forms a maximum operating angle (20°). FIG. 8 is an illustration of a state in which the fixed type constant velocity universal joint 3' being the comparative product forms a maximum operating angle (47°). As is apparent from FIG. 7 and FIG. 8, a length of a locus L1 of a contact point between the track groove 32e of the inner joint member 32 and the ball 33 in the product of the present invention is smaller than a length of a locus L1' of a contact point between the track groove 32e' of the inner joint member 32' and the ball 33' in the comparative product. When the maximum operating angle of the fixed type constant velocity universal joint 3 is thus reduced, a movement amount of the ball 33 in the axial direction is reduced. As a result, the axial length of the track groove 32e of the inner joint member 32 can be reduced $\{W_{I\text{-}TRACK}<W_{I\text{-}TRACK}'$, see the row (2) in Table 1 above$\}$. In this manner, a size of the inner joint member 32 in the axial direction is reduced, and thus reduction in weight can be achieved.

Further, as illustrated in FIG. 7 and FIG. 8, a length of a locus L2 of a contact point between the track groove 31d of the outer joint member 31 and the ball 33 in the product of the present invention is smaller than a length of a locus L2' of a contact point between the track groove 31d' of the outer joint member 31' and the ball 33' in the comparative product. When the maximum operating angle of the fixed type constant velocity universal joint 3 is thus reduced, a movement amount of the ball 33 in the axial direction with respect to the outer joint member 31 is reduced. As a result, an axial length of the track groove 31d of the outer joint member 31, in particular, an axial length of a portion of the track groove 31d on an opening side with respect to the joint center O(f), specifically, an axial length from the joint center O(f) to the opening-side end surface of the mouth section 31a of the outer joint member 31 can be reduced $\{W1_O<W1_O'$, see the row (7) in Table 1 above$\}$. In this manner, a size of the outer joint member 31 in the axial direction is reduced, and thus reduction in weight can be achieved.

When the maximum operating angle of the fixed type constant velocity universal joint 3 is reduced, the cage 34 has a sufficient margin of strength as described above. Accordingly, the axial width of the cage 34 can be reduced while maintaining durability equivalent to that of the comparative product $\{WC<WC'$, see the row (9) in Table 1 above$\}$. In this manner, a size of the cage 34 in the axial direction is reduced, and thus reduction in weight can be achieved.

When the maximum operating angle of the fixed type constant velocity universal joint 3 is reduced, the radial thickness $T_I$ of the inner joint member 32 can be reduced as described above, with the result that a diameter of the spline hole 32c of the inner joint member 32 can be increased $\{PCD_{SPL}>PCD_{SPL}'$, see the row (5) in Table 1 above$\}$. In this manner, the intermediate shaft 4 to be inserted into the spline hole 32c is increased in diameter, and thus torsional strength can be enhanced. Further, when the maximum operating angle of the fixed type constant velocity universal joint 3 is reduced, the pitch circle diameter of the balls 33 can be reduced as described above, with the result that a diameter of the outer joint member 31 can be reduced. From the above description, in the product of the present invention, a ratio $D_O/PCD_{SPL}$ of the outer diameter $D_O$ of the outer joint member 31 to the pitch circle diameter $PCD_{SPL}$ of the spline hole 32c of the inner joint member 32 can be set smaller than that of the comparative product $\{D_O/PCD_{SPL}<D_O'/PCD_{SPL}'$, see the row (6) in Table 1 above$\}$. In this manner, reduction in weight and size of the fixed type constant velocity universal joint 3, and improvement in strength of the intermediate shaft 4 can be achieved at the same time.

Further, when the diameter of the spline hole 32c of the inner joint member 32 is increased as described above, a pitch circle diameter of a fitting portion between the spline hole 32c of the inner joint member 32 and the spline 46 of the intermediate shaft 4 is increased, with the result that contact pressure at a contact portion between spline teeth is reduced. Thus, while maintaining the contact pressure for each spline tooth, the axial length of the spline hole 32c of the inner joint member 32 can be reduced. Accordingly, the axial width of the cylindrical portion 32a of the inner joint member 32 can be reduced. In this manner, not only the axial length of each of the track grooves 32e of the inner joint member 32 but also the axial length of the spline hole 32c is reduced, thereby being capable of reducing the axial width $W_I$ of the entire inner joint member 32 $\{W_I<W_I'$, see the row (3) in Table 1 above$\}$.

Figure 10A:
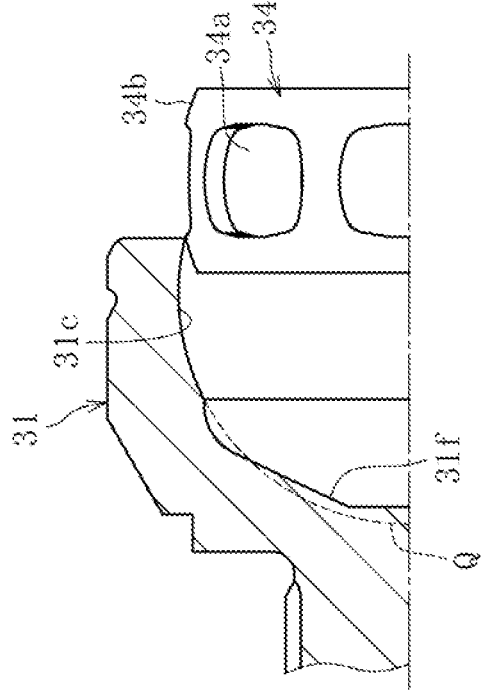
FIG. 10A is a longitudinal sectional view for illustrating a state of incorporating the cage into an inner periphery of an outer joint member of the product of the present invention.
Figure 10B:
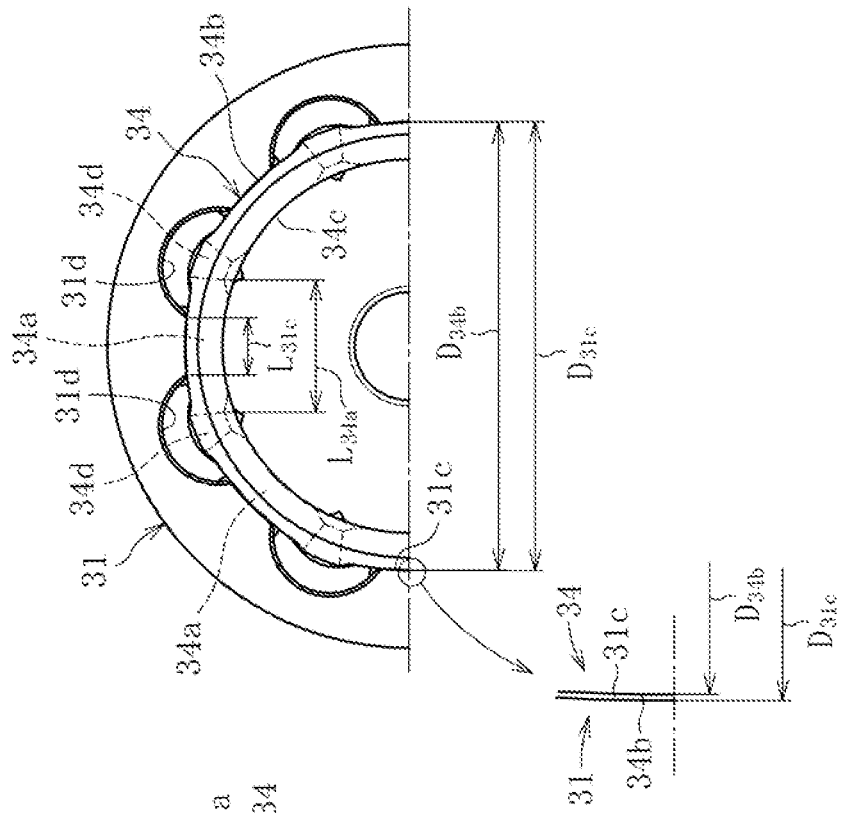
FIG. 10B is a front view for illustrating the state of FIG. 10A seen from an axial direction of the joint.

Further, when the axial length $W1_O$ of a portion of the outer joint member 31 on the opening side with respect to the joint center O(f) is reduced as described above, a projecting amount of an opening end of the spherical inner peripheral surface 31c toward the radially inner side is reduced. As a result, the inner diameter of the opening portion of the outer joint member 31 is increased. Accordingly, as illustrated in FIG. 10, a diameter $D_{31c}$ of the outer joint member 31 at the opening end of the inner peripheral surface 31c can be set larger than an outer diameter $D_{34b}$ of the cage 34 at a center portion in a circumferential direction of the pockets 34a when the cage 34 is seen from the axial direction. Further, a circumferential length $L_{31c}$ of a region between the adjacent track grooves 31d of the spherical inner peripheral surface 31c of the outer joint member 31 is smaller than a circumferential length $L_{34a}$ of each of the pockets 34a of the cage 34. In this case, under a state in which the outer joint member 31 and the cage 34 are aligned and arranged coaxially with each other, and each pillar portion 34d formed in a circumferential region between the pockets 34a of the cage 34 is arranged at a circumferential position (preferably, a circumferential center) of the track groove 31d of the outer joint member 31, a region of the outer peripheral surface 34b of the cage 34, which is opposed to the spherical inner peripheral surface 31c of the outer joint member 31, can be arranged on the radially inner side with respect to the opening end of the inner peripheral surface 31c. Thus, under a state in which the cage 34 is arranged coaxially with the outer joint member 31, the cage 34 can be incorporated into the inner periphery of the outer joint member 31 without interfering with the opening end of the inner peripheral surface 31c of the outer joint member 31.

Figure 11B:
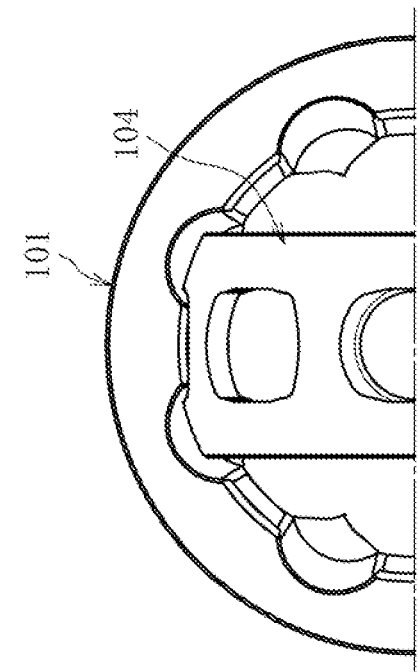
FIG. 11B is a front view for illustrating the state of FIG. 11A seen from the axial direction.
Figure 11A:
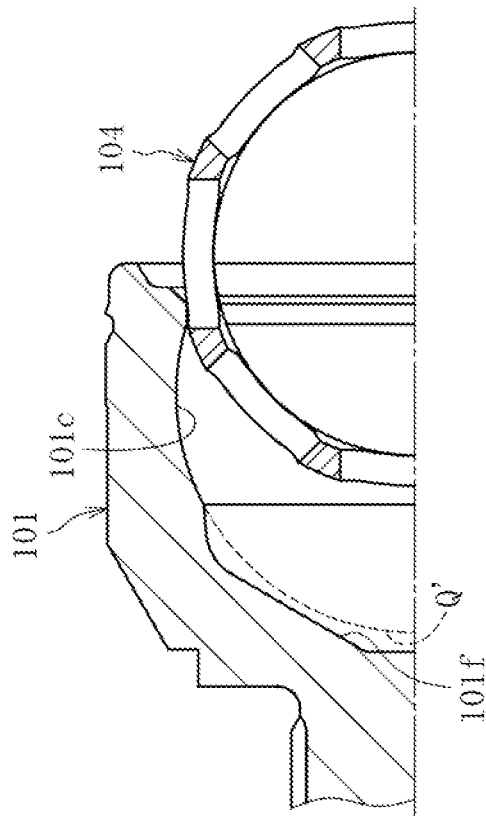
FIG. 11A is a longitudinal sectional view for illustrating a state of incorporating a cage into an inner periphery of an outer joint member of a conventional product.

Further, as in the conventional product illustrated in FIG. 11, when the cage 104 and the outer joint member 101 are assembled together under a state in which the axis of the cage 104 and the axis of the outer joint member 101 are orthogonal to each other, it is required that a space capable of receiving the cage 104 with the axis orthogonal to the axis of the outer joint member 101 be ensured inside the outer joint member 101. Specifically, as illustrated in FIG. 11A, it is required that an inner bottom surface 101f of the outer joint member 101 be arranged on a deep side with respect to an imaginary spherical surface Q' being an extension of an inner peripheral surface 101c. In contrast, as in the product of the present invention illustrated in FIG. 10, when the cage 34 and the outer joint member 31 are assembled together under a state in which an axial center of the cage 34 and an axial center of the outer joint member 31 are matched with each other, it is not required that the space capable of receiving the cage 34 with the axis orthogonal to the axis of the outer joint member 31 be ensured inside the outer joint member 31. Accordingly, an internal space of the outer joint member 31 can be reduced (shallowed) as compared to that of the conventional product illustrated in FIG. 11. Specifically, as illustrated in FIG. 10A, an inner bottom surface 31f of the outer joint member 31 can be arranged closer to a joint opening side (inboard side) so as to be allowed to interfere with an imaginary spherical surface Q being an extension of the inner peripheral surface 31c of the outer joint member 31. In this manner, an axial dimension of the outer joint member 31 can be reduced, and hence reduction in weight can be achieved.

Figure 12:
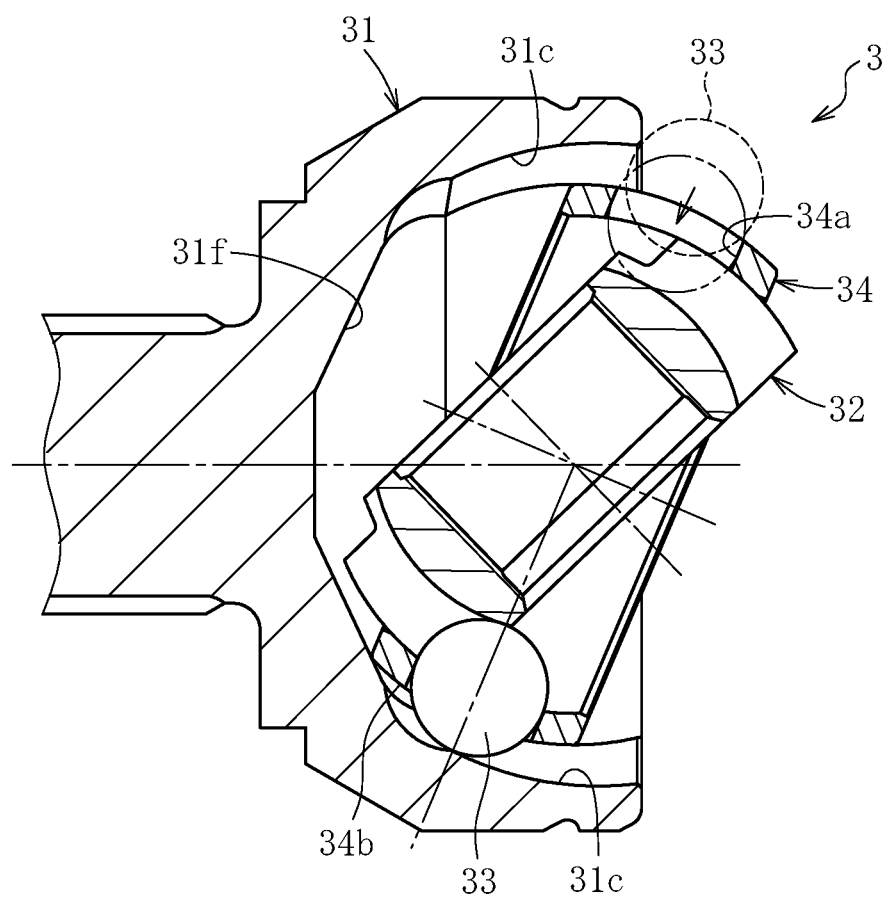
FIG. 12 is a longitudinal sectional view for illustrating a state of incorporating balls into the fixed type constant velocity universal joint being the product of the present invention.

Further, when the balls 33 are to be incorporated into the fixed type constant velocity universal joint 3 being the product of the present invention, as illustrated in FIG. 12, it is required that the outer joint member 31 and the inner joint member 32 be inclined at an angle larger than the maximum operating angle so as to expose one of the pockets 34a of the cage 34 from the outer joint member 31. When the operating angle of the fixed type constant velocity universal joint 3 is thus increased, the balls 33 (balls 33 illustrated in FIG. 12) on a plane including the axial centers of both of the members 31 and 32, and balls 33 different in phase by 90° from those balls 33 have the same phases (that is, circumferential positions with respect to the cage 34) as phases given when the operating angle is 0°. Meanwhile, balls 33 positioned in circumferential regions between the above-mentioned four balls 33 are shifted in phase (that is, moved in the circumferential direction with respect to the cage 34) from a state given when the operating angle is 0°. Therefore, it is required that the pockets 34a of the cage 34 each have a circumferential dimension large enough to allow the above-mentioned movement of the balls 33 in the circumferential direction at the time of incorporating the balls 33.

However, when all of the pockets 34a have large circumferential dimensions, there is a fear in that the pillar portions between the pockets 34a are narrowed so that strength is insufficient. Thus, in the related-art fixed type constant velocity universal joint (Rzeppa type constant velocity universal joint having eight balls), pockets each having a large circumferential dimension and pockets each having a small circumferential dimension are arranged alternately, thereby ensuring strength of the pillar portions. In this case, first, after the balls are incorporated into four pockets each having a large circumferential dimension, the balls are incorporated into four pockets each having a small circumferential dimension. In this manner, the balls can be incorporated into all of the pockets. However, when the balls are incorporated into the pockets in an incorrect order, the balls cannot be incorporated. Thus, the operation of incorporating the balls requires much time and effort.

In the fixed type constant velocity universal joint 3 described above, through reduction of the maximum operating angle, the operating angle at the time of incorporating the balls is smaller than that in the conventional product. Accordingly, the circumferential dimension of each of the pockets 34a of the cage 34 can be set smaller than that of the conventional product. As a result, even when all of the pockets 34a have an equal circumferential dimension, strength of the pillar portions between the pockets 34a can be ensured. In this case, the balls 33 may be incorporated into any pockets 34a, and hence the operation of incorporating the balls 33 is facilitated. In this embodiment, as illustrated in FIG. 12, when the balls 33 are incorporated into the fixed type constant velocity universal joint 3, a joint-deep-side end portion of the outer peripheral surface 34b of the cage 34 is brought into abutment against the bottom surface 31f of the outer joint member 31, thereby preventing further increase in operating angle.

As described above, according to the present invention, in consideration of various conditions obtained by reducing the maximum operating angle of the constant velocity universal joint, study is made on the internal specifications of the constant velocity universal joint, thereby reducing the weight and size of the constant velocity universal joint while maintaining torque load capacity equivalent to that of the comparative product. Thus, there can be launched a new series of fixed type constant velocity universal joints each having a small weight and a small size and being usable exclusively for the rear-wheel drive shaft.

The present invention is not limited to the above-mentioned embodiment. Description is made of the example in which the above-mentioned fixed type constant velocity universal joint comprises the eight balls 33, but the number of the balls may be increased or reduced. For example, the fixed type constant velocity universal joint may comprise six or ten balls. Further, in the embodiment described above, description is made of the example in which the fixed type constant velocity universal joint is a Rzeppa type constant velocity universal joint in which a groove bottom of each of track groove is formed only of an arc, but the present invention is not limited thereto. For example, the present invention may be applied to an undercut-free constant velocity universal joint in which a groove bottom of each of track grooves is formed of an arc and a straight line.

Further, the above-mentioned fixed type constant velocity universal joint is usable not only for the rear-wheel drive shaft of a rear-wheel drive vehicle (such as an FR vehicle) that drives only rear wheels, but also for a rear-wheel drive shaft of a four-wheel drive vehicle (in particular, a four-wheel drive vehicle in which rear wheels serve as main driving wheels). In a sport utility vehicle (SUV), wheels move up and down greatly, and angular displacement of drive shafts is large. Accordingly, the fixed type constant velocity universal joint having the low operating angle as described above is not applicable in some cases. Therefore, it is preferred that the above-mentioned fixed type constant velocity universal joint be applied to a rear-wheel drive shaft of a rear-wheel drive automobile or a four-wheel drive automobile.

REFERENCE SIGNS LIST 1 rear-wheel drive shaft
2 plunging type constant velocity universal joint
21 outer joint member
22 inner joint member
23 ball
24 cage
3 fixed type constant velocity universal joint
31 outer joint member
31d track groove
32 inner joint member
32c spline hole
32e track groove
33 ball
34 cage
34a pocket
4 intermediate shaft
$D_{31c}$ diameter of outer joint member at opening end of inner peripheral surface
$D_{34b}$ outer diameter of cage at center portion in circumferential direction of pockets when cage is seen from axial direction of joint
O joint center
Q imaginary spherical surface being extension of inner peripheral surface of outer joint member toward deep-side

The invention claimed is:

1. A fixed type constant velocity universal joint comprising:
- an outer joint member, which comprises a mouth section having a cup shape that is open toward one side in an axial direction of the fixed type constant velocity universal joint, is a single component, and has a spherical inner peripheral surface in which eight track grooves are formed;
- an inner joint member having a spherical outer peripheral surface in which eight track grooves are formed;
- a plurality of balls arranged in ball tracks formed by the track grooves of the outer joint member and the track grooves of the inner joint member; and
- a cage, which has a plurality of pockets configured to receive the balls, and is held in slide contact with the inner peripheral surface of the outer joint member and the outer peripheral surface of the inner joint member, wherein a diameter of the outer joint member at an opening end of the inner peripheral surface is larger than an outer diameter of the cage at a center portion in a circumferential direction of the pockets when the cage is seen from the axial direction, wherein a bottom surface of the mouth section of the outer joint member comprises a part arranged at an opening side with respect to an imaginary spherical surface, which is an extension of the inner peripheral surface of the outer joint member, toward an opposite side to the opening side of the mouth section of the outer joint member, and wherein a curvature center of the track grooves of the outer joint member and a curvature center of the track grooves of the inner joint member are offset to opposite sides in the axial direction with respect to a joint center by an equal distance.

* * * * *